United States Patent [19]
May et al.

[11] Patent Number: 5,270,023
[45] Date of Patent: Dec. 14, 1993

[54] PROCESS FOR PRODUCING SODIUM CARBONATE, SODIUM BICARBONATE AND ASSOCIATED COMPOUNDS

[76] Inventors: Frank H. May, P.O. Box 3087, Mesa, Ariz. 85275; Fred C. Hohne, 14940 E. Janine Dr., Whittier, Calif. 90605

[21] Appl. No.: 969,061

[22] Filed: Oct. 30, 1992

[51] Int. Cl.$^5$ .................. C01D 7/12; C01D 7/26
[52] U.S. Cl. .................. 423/182; 423/194; 423/421; 423/424
[58] Field of Search .......... 423/425, 206 T, 421, 423/422, 186, 189, 190, 423, 424, 427, 429, 182, 194

[56] References Cited

U.S. PATENT DOCUMENTS

| | | | |
|---|---|---|---|
| 3,505,009 | 4/1970 | van Damme-van Weele | 423/423 |
| 4,217,330 | 8/1980 | Nakaya et al. | 423/422 |
| 4,291,002 | 9/1981 | Arnold et al. | 423/422 |
| 4,564,508 | 1/1986 | Fairweather et al. | 423/189 |
| 4,584,077 | 4/1986 | Chlanda et al. | 423/206 T |
| 4,743,439 | 5/1988 | Ready | 423/421 |

FOREIGN PATENT DOCUMENTS

| | | |
|---|---|---|
| 1567911 | 5/1973 | Fed. Rep. of Germany . |
| 49-10197 | 1/1974 | Japan . |
| 726024 | 4/1980 | U.S.S.R. . |

*Primary Examiner*—David Brunsman
*Attorney, Agent, or Firm*—Edgar W. Averill, Jr.

[57] ABSTRACT

A process for producing sodium carbonate from a variety of crude ores and brine containing sodium bicarbonate and sodium carbonate without the use of calcium carbonate. The process includes the steps of reacting the raw materials containing sodium bicarbonate and sodium carbonate with a bicarbonate filtrate containing ammonium chloride brine solution under heat, producing ammonia, carbon dioxide, and a mother liquor containing an aqueous solution of sodium chloride which is recycled. This solution may contain also sodium bicarbonate and sodium carbonate to enhance production. The mother liquor is separated and reacted with ammonia and carbon dioxide collected from the reacting step to crystalize sodium bicarbonate and produce an ammonium chloride brine solution which is recycled to react with the crude ore. In summary, the process will produce the equivalent sodium carbonate related to the ammonium chloride content of the bicarbonate filtrate in addition to the dissolved sodium carbonate values in the recycled ammonium chloride brine. The solution may be carried out on mined crude ore above ground or instead heated ammonium chloride brine solution may be pumped directly into the ore body in situ. Alternatively, heated sodium chloride solution may be passed through an underground ore deposit and the resulting solution reacted with ammonium chloride brine solution.

6 Claims, 3 Drawing Sheets

PROCESS FOR PRODUCING SODIUM CARBONATE, SODIUM BICARBONATE AND ASSOCIATED COMPOUNDS

BACKGROUND OF THE DISCLOSURE

The field of the invention is conventional mining and milling and solution mining and the invention relates more particularly to the production of sodium carbonate or sodium bicarbonate from crude ores such as trona, nancolite, naturally occurring brines, or complex carbonate minerals. In the past, the Solvay process was commonly used for the production of soda ash, but the Solvay plant facilities in the United States and in other environmentally sensitive areas around the world have been shut down and abandoned since substantial amounts of calcium chloride were produced and there was no practical manner of recycling a disposal of this by-product. The Solvay process reacts the sodium radical in sodium chloride with the carbon dioxide present in limestone using ammonia as an interminable reactant.

Most domestically produced soda ash is produced from buried naturally occurring deposits of trona (sodium sesquicarbonate) in the Green River Basin in Wyoming. The ores are mined through deep shafts by conventional room and pillar or long wall mining methods. Soda ash is recovered by one of two common processes referred to by the industry as the mono hydrate process and the trona process. Both processes have the following disadvantageous: numerous operating steps; lack of efficiency, high manpower requirements; and high capital and operating costs.

SUMMARY OF THE INVENTION

It is the object of the present invention to provide a process which directly recovers sodium carbonate, and sodium bicarbonate values from naturally occurring ores, and brines requiring no or minimal amounts of extraneous reagents with a minimum of undesired by-product production.

The present invention is for a solution process for producing sodium carbonate from crude ores containing sodium bicarbonate and sodium carbonate without the use of calcium carbonate or sodium chloride as raw materials. The process comprises the steps of reacting the crude ores with a bicarbonate filtrate containing ammonium chloride brine solution under heat to produce ammonia, carbon dioxide, and a mother liquor containing an aqueous solution of sodium chloride, which is recycled. This solution may also contain sodium bicarbonate and sodium carbonate, to enhance production. This mother liquor is combined with the ammonia and carbon dioxide to crystallize sodium bicarbonate from the solution leaving a filtrate containing ammonium chloride brine solution which is returned to the reacting step. The sodium bicarbonate crystals are then treated and purified in a normal manner and typically converted to sodium carbonate. This process may be carried out either above ground on mined ore or in situ by injecting the bicarbonate filtrate directly into the ore body. Hot sodium chloride is injected and the returned solutions are reacted with ammonium chloride brine and sent to carbonating towers. Alternatively, hot ammonium chloride is injected directly into the ore body and results in the product of $NH_4$ and $CO_2$ underground and saturated NaCl returned to the surface and the gases are collected and sent to carbonation.

DESCRIPTION OF THE PREFERRED EMBODIMENTS

Figure 1:
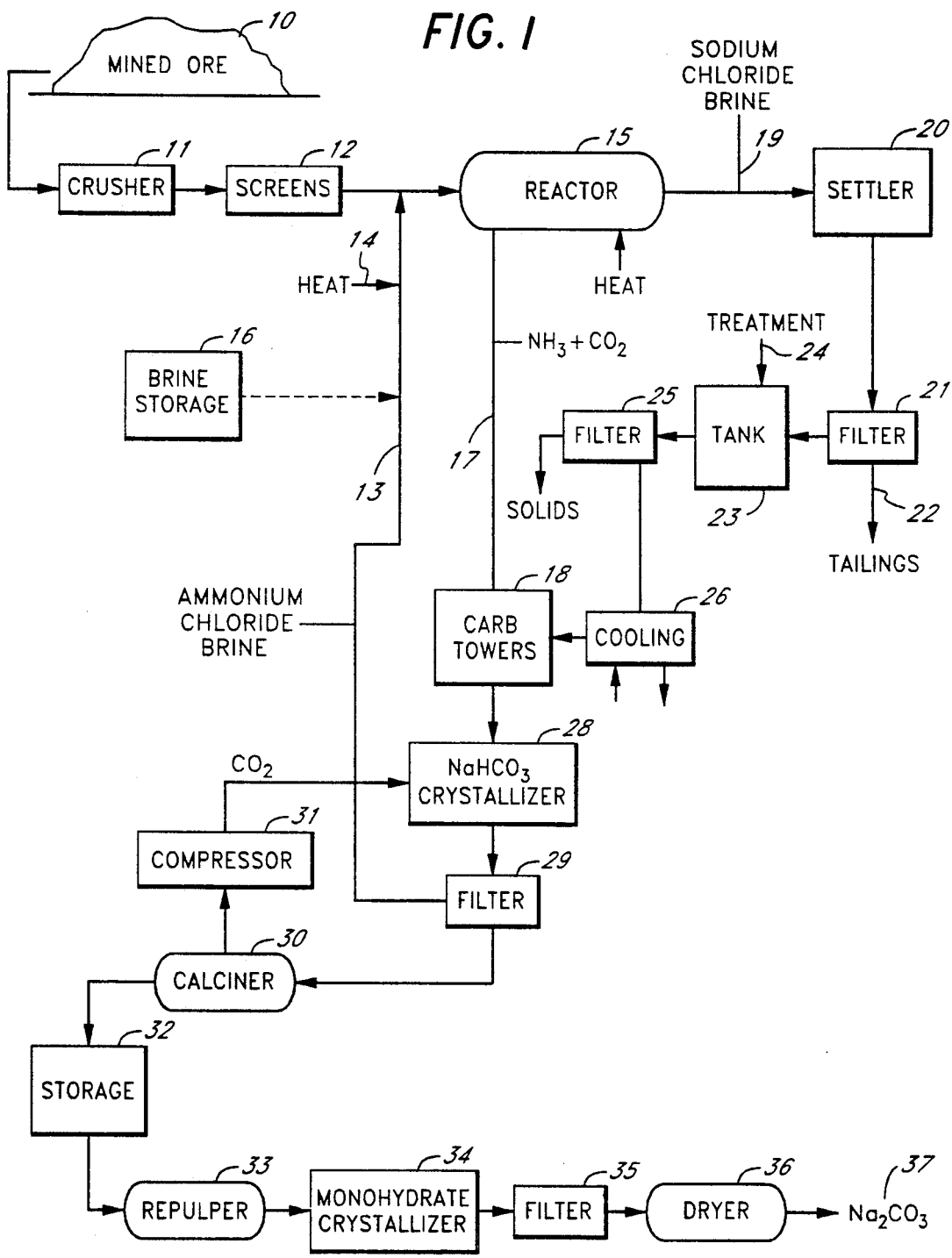
FIG. 1 is a flow sheet of a first variation of the process of the present invention.

The process of the present invention is designed to utilize a modified ammonia soda (Solvay) process for the recovery of naturally occurring deposits of soluble carbonate minerals. The process eliminates the basic requirements for raw material sodium chloride, carbon dioxide, water and limestone or calcium carbonate. The process involves a leach cycle to effectively dissolve the ore and is efficient in recovering essentially all dissolved and reacted carbonate values contained in each leach cycle without the use of evaporation. This process otherwise is identical to the ammonia-soda process. The process can be designed to produce the equivalent sodium carbonate related to the ammonium chloride content of the bicarbonate filtrate in addition to the dissolved sodium carbonate values in the recycled sodium chloride brine.

The basic process utilizes the ammonium chloride filtrate from the bicarbonate filtrate step as a recycled brine. The brine is heated and reacted with the mined raw material ore or injected into the underground ore body to produce a recycled saturated brine. The hot ammonium chloride brine acts as a strong acid and reacts with the solid or dissolved carbonate minerals to regenerate the sodium chloride equivalent of the ammonium chloride and evolve ammonia and carbon dioxide in accordance with the following reaction in the case of trona ores:

$$3\ NH_4Cl + Na_2CO_3 \cdot NaHCO_3 \rightarrow 4\ H_2O + 3\ NaCl + 3\ NH_3 + 3\ CO_2$$

The sodium chloride is recovered in the reaction solution. This solution is filtered and treated to remove dissolved impurities and later reacted with the evolved ammonia and carbon dioxide in the carbonation-sodium bicarbonate crystallization step of the process. The crystallized sodium bicarbonate is filtered and calcined to produce anhydrous sodium carbonate and evolved carbon dioxide and water which are recovered and recycled to the carbonators. The sodium carbonate is recrystallized as the monohydrate and dried to produce the refined sodium carbonate product. The refined product is equivalent to the sodium carbonate values extracted from the crude ore.

The basic process is versatile and can be designed to recover carbonate values from mined ore, subterranean or surface deposits and from sodium chloride saturated brines. Many carbonate deposits contain varying amounts of solid sodium chloride. With this process, sodium chloride is beneficial in serving to saturate dilution water including that resulting from processing hydrated ores such as trona. Experiment has shown hot saturated sodium chloride solutions to be an effective reagent for dissolving and recovering soluble carbonate minerals. A recycle leach process with saturated sodium chloride brines is effective at temperatures of 80° C. and above. However, the rate of solution and concentration of dissolved salts favors the higher temperature leaching process. The preferred temperature of operation is at about 100° C. or above. Some variations of the process include a saturated sodium chloride recycle step for recovery of the soluble underground salts as a saturated solution and carrying out the decomposition as an aboveground reaction. The concentration of leached salts can vary in relation to the amount of dissolved inert salts such as sodium sulfate or potassium salts. The solution of trona in the saturated sodium solution, apparently reaches saturation at a point saturated with respect to both sodium bicarbonate and trona. At the 100° C. leaching temperature, sodium bicarbonate decomposes and some evolution of carbon dioxide is evident as the ore is first contacted with the hot leaching solution. The decomposition reaction is, in effect, a reverse carbonation reaction and would increase the carbonate concentration and adjust the solution to a composition saturated with trona.

A hot saturated sodium chloride recycle leach process can be used to advantage in conjunction with the proposed process as a method for solution mining trona ores. The 100° C. trona leach solution, when cooled to 26° C. crystallized trona in an amount equal to 7 pounds per 100 pounds of the leach solution. The dissolved trona remaining in solution was determined, based on 30° C. solubility data, to be equal to 5.04 percent by weight, making a total of 12.04 pounds of trona leached per 100 pounds of saturated leach brine. Using these values and 100 units of water as a basis for calculations, it is possible to estimate the production efficiency of the process for recovering and processing underground deposits of trona. With the above data and assuming the ammonium chloride brine to contain 20 gm. ammonium chloride per 100 gm. of water, the estimated yield of sodium bicarbonate would be approximately 52 gm. per 100 gm. water or 36 gm. per 100 gm. brine. These results are not corrected for water balance and are possibly lower than the true values because of the free carbonate in the saturated brine not evaluated or used in the calculations.

A flow diagram of the process is shown in FIG. 1. The mined ore 10 is passed through a crusher 11 and through a screen assembly 12. It is mixed with ammonium chloride brine stream 13 which has been heated as indicated at 14 and passed into a heated reactor 15. A small amount of sodium chloride brine 16 is added to the ammonium chloride brine to prevent crystallization. The reaction would typically be carried out at an atmospheric or above pressure, 100° C. The reaction which takes place in the reactor is generally as follows:

$3\ NH_4Cl + Na_2CO_3 \cdot NaHCO_3 \rightarrow 4\ H_2O + 3NaCl + 3\ NH_3 + 3\ CO_2$ The gas streams of ammonia and carbon dioxide pass through line 17 to carbonation towers 18. The sodium chloride brine solution passes through line 19 to a settlor 20 and through a filter 21 and the tailings 22 are removed. The brine solution may be treated as with the addition of precipitating or purification reagents as shown at 24 and passed through a second filter 25 cooled at 26 and passed into carbonation towers 18. There, the carbon dioxide, sodium chloride, and ammonia cause the sodium bicarbonate to crystalize by the carbonation reaction. The carbonation tower is typically operated at the normal pressure and temperature used in the Solvay process. The reaction is completed in crystallizer 28 which is also operated at typical pressures and temperatures as in the Solvay process, and is filtered at 29 where the filtrate passes through line 13 as ammonium chloride brine.

The sodium bicarbonate crystals pass into conventional calciner 30 where the evolved water and $CO_2$ pass through compressor 31 and into the sodium bicarbonate crystallizer 28. The soda ash then goes to storage area 32 where it can be passed through a repulper 33, a crystallizer 34, a filter 35, and a conventional dryer 36 to provide the final soda ash 37.

Figure 2:
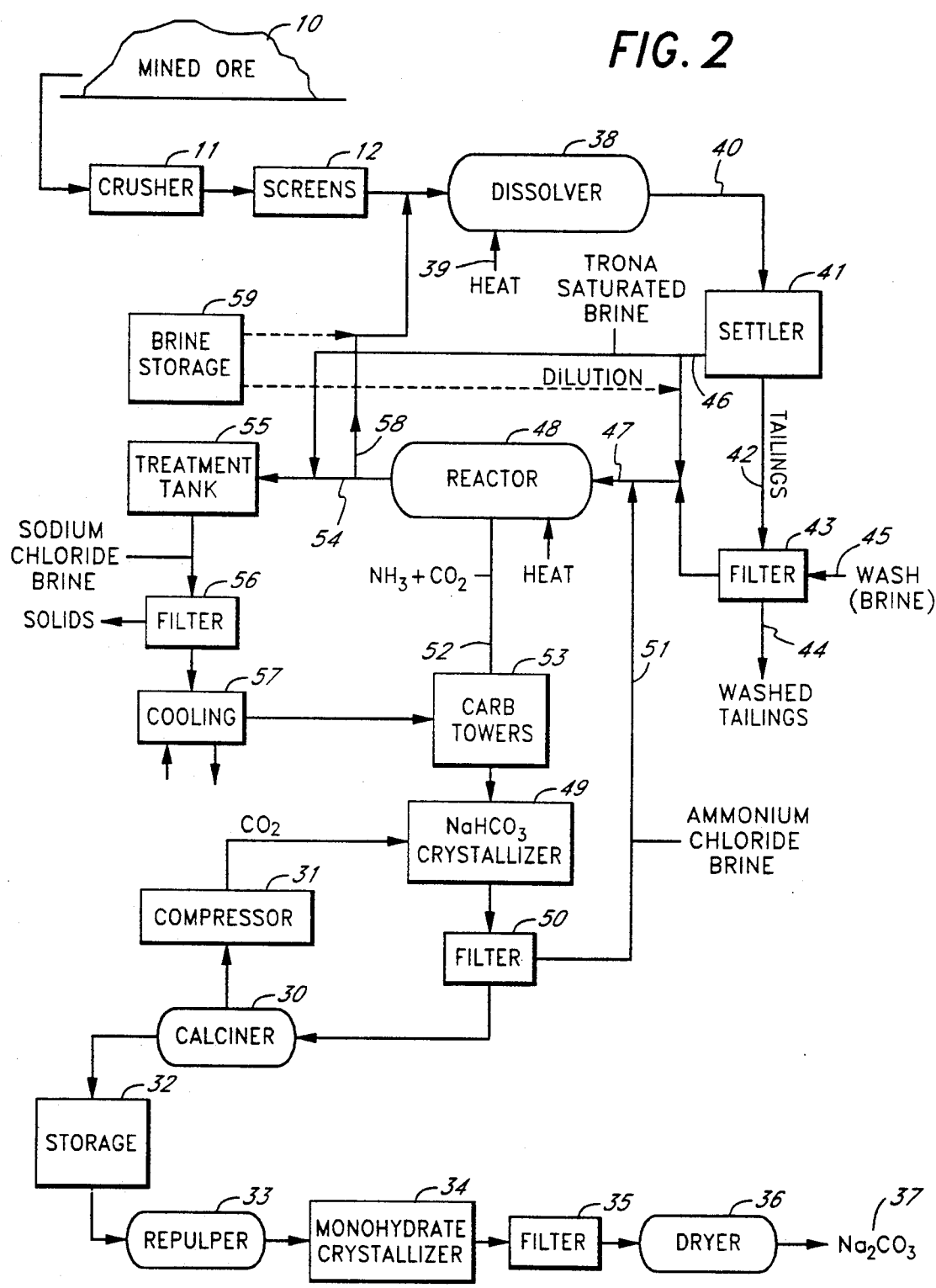
FIG. 2 is a flow sheet showing a second variation of the process of the present invention.

A variation of the process of FIG. 1 is shown in FIG. 2 where the recycled sodium chloride brine is saturated with trona by a preliminary leach step before sending the saturated solution to the carbonators. Thus, the mined ore 10 is crushed at 11 screened at 12 and passes into a dissolver 38 which is maintained at about 100° C. or above at 39 to create a decomposition reaction and create a saturated brine 40. Brine 40 passes through a settlor 41 where the tailings 42 are filtered at 43 and exit at 44. A wash brine stream 45 is then mixed with the trona saturated brine 46 and passes through line 47 to reactor 48. Ammonium chloride brine, which has passed through the sodium bicarbonate crystallizer through filter 50, is mixed with the saturated brine 40 as it exits line 51 upstream of the reactor. The reactor is heated and, as described above, produces ammonia and carbon dioxide which pass through line 52 to a carbonation tower 53. The sodium chloride exits the reactor through line 54 and passes into a treatment tank 55, is filtered at 56, cooled at 57 and passes into the carbonation towers 53. As above, the sodium bicarbonate crystals are filtered at 50 and passed through calciner 30. The gases of carbon dioxide and water vapors are compressed at 31 to the hydrostatic operating pressure of the towers and recycled to the ammonium bicarbonate crystallizer 49. The soda ash passes into storage area 32 and then can be purified as above through repulp 33, crystallizer, 34, filter 35, and drier 36 to provide the pure soda ash 37.

Returning now to the sodium chloride brine solution exiting reactor 48, a portion of this may be recycled to the dissolver 38 through line 58 and a brine storage tank 59 may be used to keep the appropriate solution volume.

Figure 3:
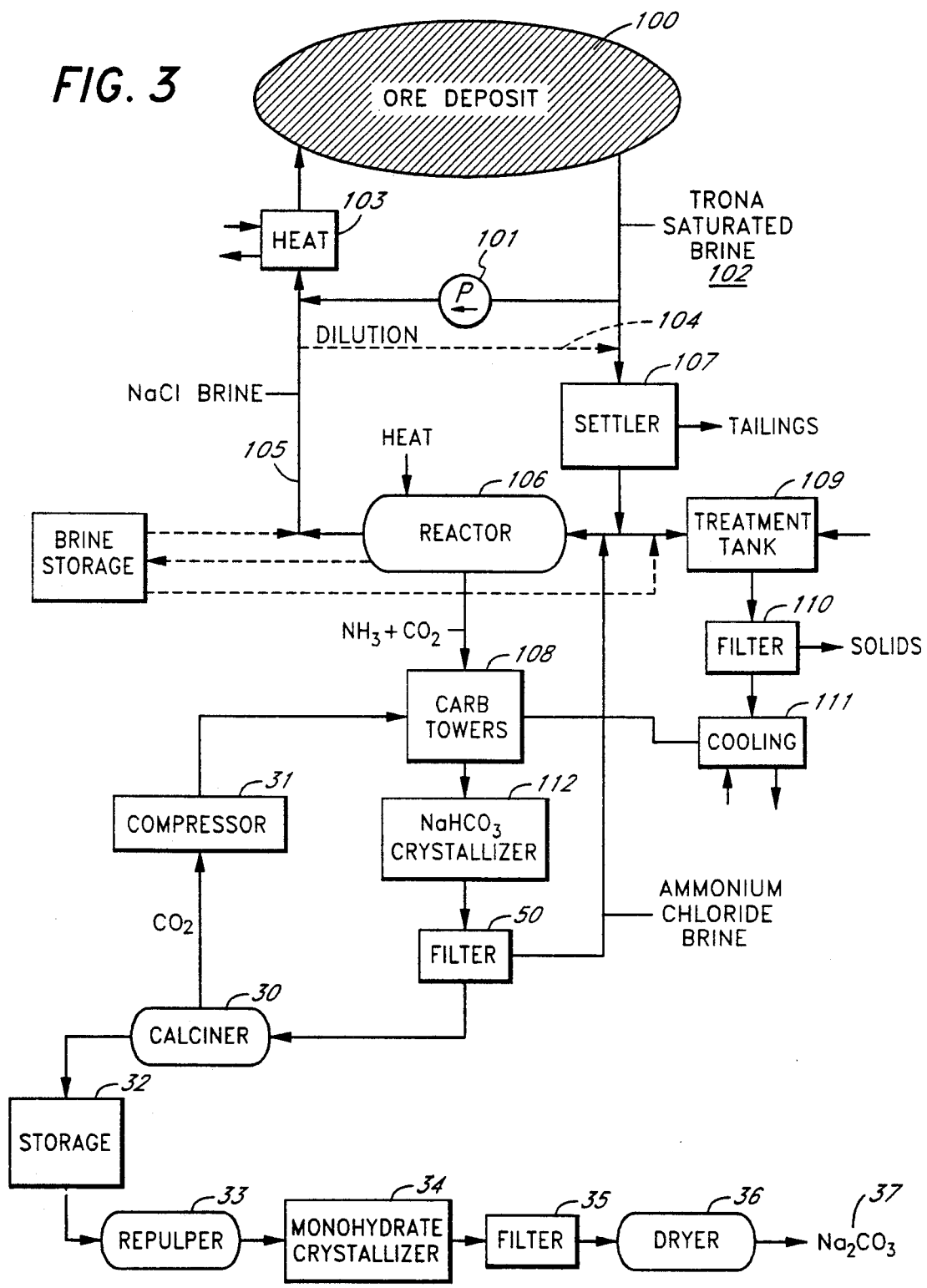
FIG. 3 is a flow sheet showing an in situ version of the process of the present invention.

The in situ process of the present invention is shown in FIG. 3 where an underground ore deposit is indicated by reference character 100. A pump 101 recycles trona saturated brine 102 through ore deposit 100. This recycled leach liquor consisting largely of trona saturated brine may be diluted slightly with sodium chloride brine through line 104. The sodium chloride brine has exited reactor 106 through line 105. The slightly diluted trona saturated brine 102 is passed through a settlor to separate any insoluble tailings. The process stream is next separated into two controlled streams, one going to the reactor 106, and the other to the ammonia carbonating towers 108. The saturated sodium chloride leach brine going to the reactor is combined with the bicarbonate ammonium chloride filtrate and injected into the reactor where the decomposition reaction takes place. The evolved ammonia and carbon dioxide are sent to the ammonia soda carbonators 108 where sodium bicarbonate is crystallized by the carbonation reaction. The sodium bicarbonate is crystallized at 112 and then passed through the purifying and calcining steps described above consisting of filter 50, calciner 30, storage area 32, repulper 33, monohydrate crystallizer 34, filter 35, drier 36 to provide the purified soda ash 37. The second controlled stream from settlor 107 passes through a treatment tank 109 where materials such as carbon or filter aids, etc. may be added as needed, is filtered at 110 cooled at 111 and passed into the carbonating towers 108.

The processing of either trona or nacolite ores produce an excess of carbon dioxide which would be used to compensate for losses. The bicarbonate filtrate (ammonium chloride brine) is sent to the reactor to produce the regenerated sodium chloride brine which is recycled to the underground ore deposit to complete the process.

The process for recovering the values from nacolite deposits does not involve a recycling dissolving cycle due to the low solubility of bicarbonate in sodium chloride solutions. This would be the case for any low solubility mineral. The underground extraction process would involve the injection of the heated ammonium chloride brine directly into the deposit and recovering the evolved ammonia and carbon dioxide along with the regenerated sodium chloride brine. Aboveground operation would involve the direct reaction with the mined ore if available. In either case the reaction products would be recycled to the carbonators to produce crystallized bicarbonate and the ammonium chloride brine filtrate for recycle. Both trona and nacolite as raw materials generate an excess of carbon dioxide which is more than adequate to compensate for losses in the bicarbonate calcining step.

The process, when used to recover different composition mineral deposits, would have to be modified accordingly. For example, if the mineral being processed was a sodium sulfate containing brine or solid mineral, solid phase sodium sulfate would crystallize during the decomposition reaction step. This could be recovered as a separate product or disposed of as tailings. Other compounds, such as Gaylussite or Dawsonite would require the separation of calcium carbonate or aluminum in some form as separate products or as insolubles from the regenerated sodium chloride brine.

Solubility data for the point saturated with sodium bicarbonate and trona in saturated sodium chloride solutions are as follows:

| Temp. Deg. C. | Weight % | | | |
| --- | --- | --- | --- | --- |
| | Na2CO3 | NaHCO3 | NaCl | H2O |
| 30 | 2.53 | 1.68 | 24.01 | 71.78 |
| 35 | 3.01 | 1.34 | 23.92 | 71.73 |
| 45 | 3.04 | 1.99 | 23.91 | 71.06 |
| 60 | 3.28 | 2.20 | 24.12 | 70.40 |
| 100* | 4.69 | 3.72 | 24.01 | 67.58 |

*(Estimated from experimental data)
*Searles lake brine 70° F., Weight %
NaCl 16.50
Na2SO4 6.82
KCl 4.82
Na2CO3 4.80
Na2B4O7 1.51
Water by difference 65.22
*Teeple The present invention provides an economical process for recovering quality soda ash, sodium bicarbonate, or sodium sesquicarbonate products by solution mining. mining. Because of the extensive recycling and lack of abundant end liquors and tailings, the process is environmentally sound. In the cyclic method of the present invention, the sodium chloride saturated injection solvent may contain other chlorides, sulfates, borates, or phosphates. These soluble impurities will not adversely affect the application of this invention, in fact, these ions commonly occur with saline brine deposits which in some cases can be recovered economically by this method.

If the process of the present invention is used to solution mine nacolite deposits, the carbon dioxide is in balance if the desired product is sodium bicarbonate. If the desired product is soda ash, however, an excess of carbon dioxide is available for use or disposal.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for producing sodium carbonate from crude ores containing sodium bicarbonate and sodium carbonate without the use of calcium carbonate, said process comprising the steps of:

reacting the crude ores containing sodium bicarbonate and sodium carbonate with a bicarbonate filtrate containing ammonium chloride brine solution under heat to produce ammonia, carbon dioxide, a mother liquor containing an aqueous solution of sodium chloride, sodium bicarbonate, and, sodium carbonate, and a solids portion of ore tailings;

separating said ammonia and said carbon dioxide from said mother liquor and solids portion:

separating said mother liquor from the ore tailings;

combining said mother liquor with said ammonia and said carbon dioxide to crystallize the sodium bicarbonate and sodium carbonate as sodium bicarbonate crystals and a bicarbonate filtrate and said bicarbonate filtrate containing ammonium chloride brine solution;

separating the sodium bicarbonate crystals and the bicarbonate filtrate containing ammonium chloride brine solution;

returning said ammonium chloride brine solution to said reacting step; and passing said sodium bicarbonate crystals to a calciner to convert the sodium bicarbonate to sodium carbonate.

2. The process of claim 1 wherein said reacting step is carried out in situ by injecting said bicarbonate filtrate containing ammonium chloride brine solution, heated, into ore body containing a carbonate ore.

3. A process for producing sodium carbonate from crude underground ores in situ, said crude ores containing sodium bicarbonate and sodium carbonate said process comprising the steps of:

pumping heated sodium chloride-containing brine into the crude ores containing sodium bicarbonate and sodium carbonate to produce a saturated chloride solution;

withdrawing said saturated solution to an aboveground reactor and adding ammonium chloride brine solution to produce ammonia, carbon dioxide, a mother liquor containing an aqueous solution of sodium chloride, sodium bicarbonate, and, sodium carbonate, and a solids portion of ore tailings;

separating said mother liquor form the ore tailings into a first and a second portion;

separating said mother liquor from the ore tailings;

separating said mother liquor into a first and second stream;

combining the first stream of said mother liquor with said ammonia and said carbon dioxide to crystallize the sodium bicarbonate and sodium carbonate as sodium bicarbonate crystals and a bicarbonate filtrate and said bicarbonate filtrate containing ammonium chloride brine solution;

recycling the second stream of said mother liquor to said pumping step;

separating the sodium bicarbonate crystals and the bicarbonate filtrate containing ammonium chloride brine solution;

returning said ammonium chloride brine solution to said reacting step; and passing said sodium bicarbonate crystals to a calciner to convert the sodium bicarbonate to sodium carbonate.

4. A cyclic process for recovering alkali products from mined, crushed and sized trona ore comprising:

reacting said crushed and sized trona ore with a hot saturated aqueous ammonium chloride solution to effect the dissolution of the ore in a heated reactor to produce gaseous ammonia and carbon dioxide, and a mother liquor containing sodium chloride, sodium bicarbonate, sodium carbonate and a mudstone and shale portion of ore tailings;

separating the resultant mother liquor and gasses from the mudstone and shale solids portion of the ore;

combining, in carbonating towers, said mother liquor with said gaseous carbon dioxide and ammonia to produce crystallized alkali values and a carbonate solution;

separating the crystallized alkali values from the carbonate solution in said carbonating tower, said solution comprising a carbonate filtrate containing an ammonium chloride brine solution;

reheating and returning said ammonium chloride brine solution to said reacting step and repeating said cycle of recovery;

passing said alkali values to a dryer and then to a calciner to convert the sodium bicarbonate to soda ash and to produce carbon dioxide; and returning said carbon dioxide from the calciner to said combining step.

5. The cyclic process for recovering alkali products of claim 4 wherein said reacting step is carried out in situ by heating said carbonate filtrate and injecting said carbonate filtrate containing heated ammonium chloride brine solution into an ore body containing a carbonate ore.

6. A process for recovering alkali products from a crude underground ore body containing sodium bicarbonate and sodium carbonate, said process comprising the steps of:

pumping a hot brine solution containing sodium chloride and ammonium chloride into said crude underground ore to produce a saturated trona solution;

withdrawing said saturated trona solution to an above-ground heated reactor;

reacting said saturated trona solution with a recycled ammonium chloride brine solution to produce gaseous ammonia and carbon dioxide, a mother liquor containing an aqueous solution of chloride, sodium bicarbonate, and sodium carbonate, and a solids portion of sediments from said crude ore;

separating said mother liquor into a first stream and a second stream;

combining said first stream with the ammonia and carbon dioxide produced in said reacting step in carbonating towers to crystallize sodium bicarbonate to produce crystallized sodium bicarbonate and a filtrate containing an ammonium chloride brine solution;

heating said second stream and recycling it to said pumping step;

passing said crystallized sodium bicarbonate to a calciner to convert the sodium bicarbonate to sodium carbonate; and passing said ammonium chloride brine solution to said reacting step.

* * * * *